June 11, 1957   R. L. O'HARA   2,795,176
PULVERIZING MACHINE
Filed Sept. 29, 1955   3 Sheets-Sheet 1

INVENTOR.
RAYMOND L. O'HARA
BY
Edward L. Dumpston
HIS ATTORNEY.

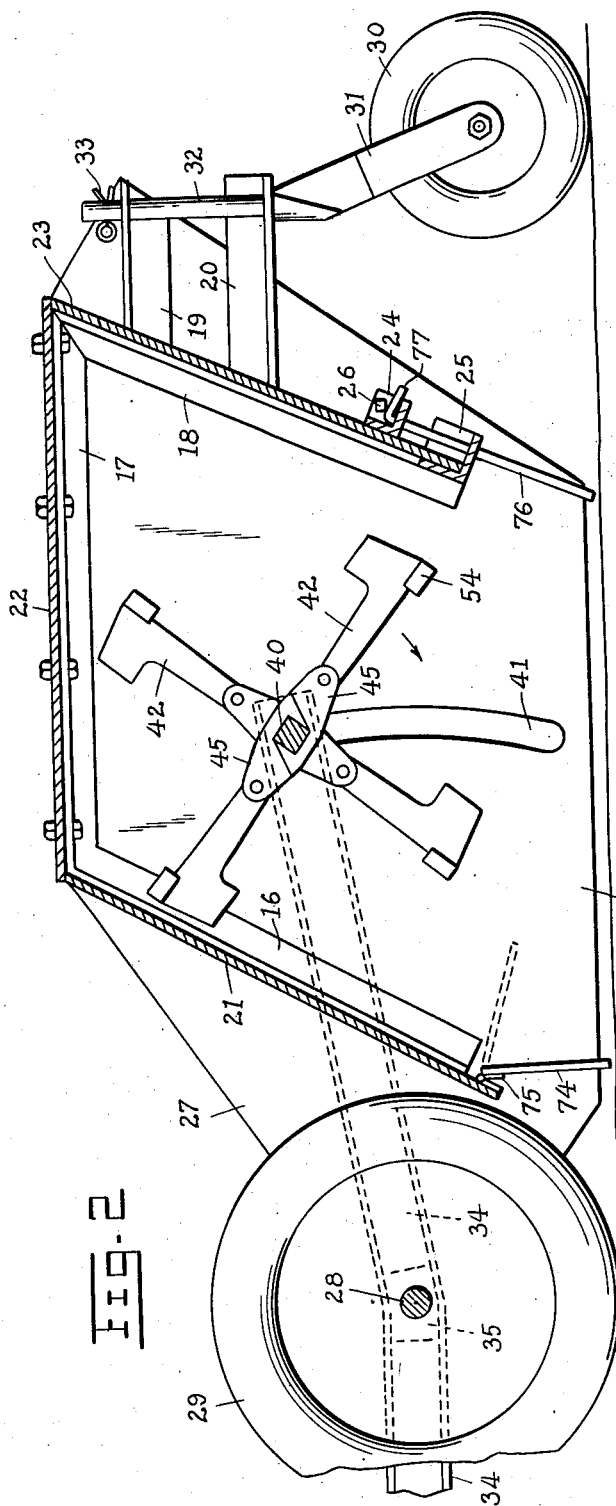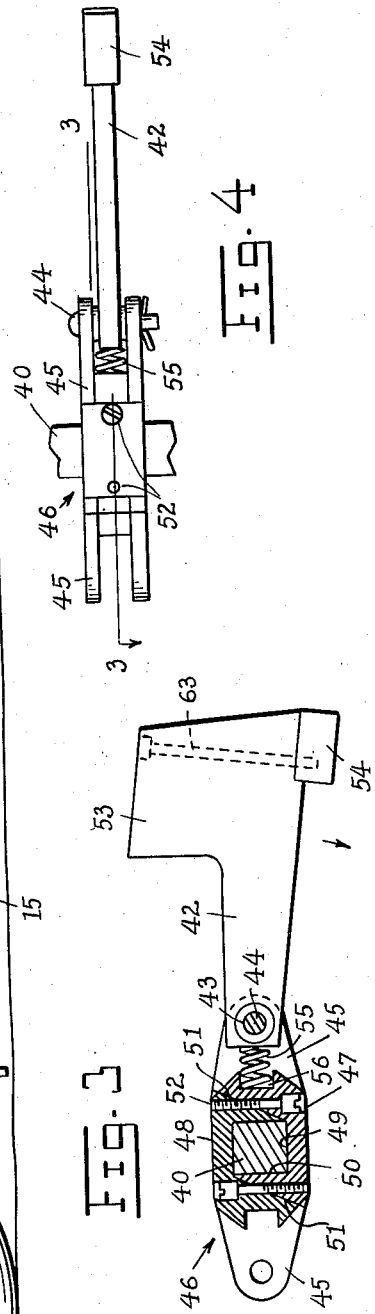

June 11, 1957 R. L. O'HARA 2,795,176
PULVERIZING MACHINE
Filed Sept. 29, 1955 3 Sheets-Sheet 3
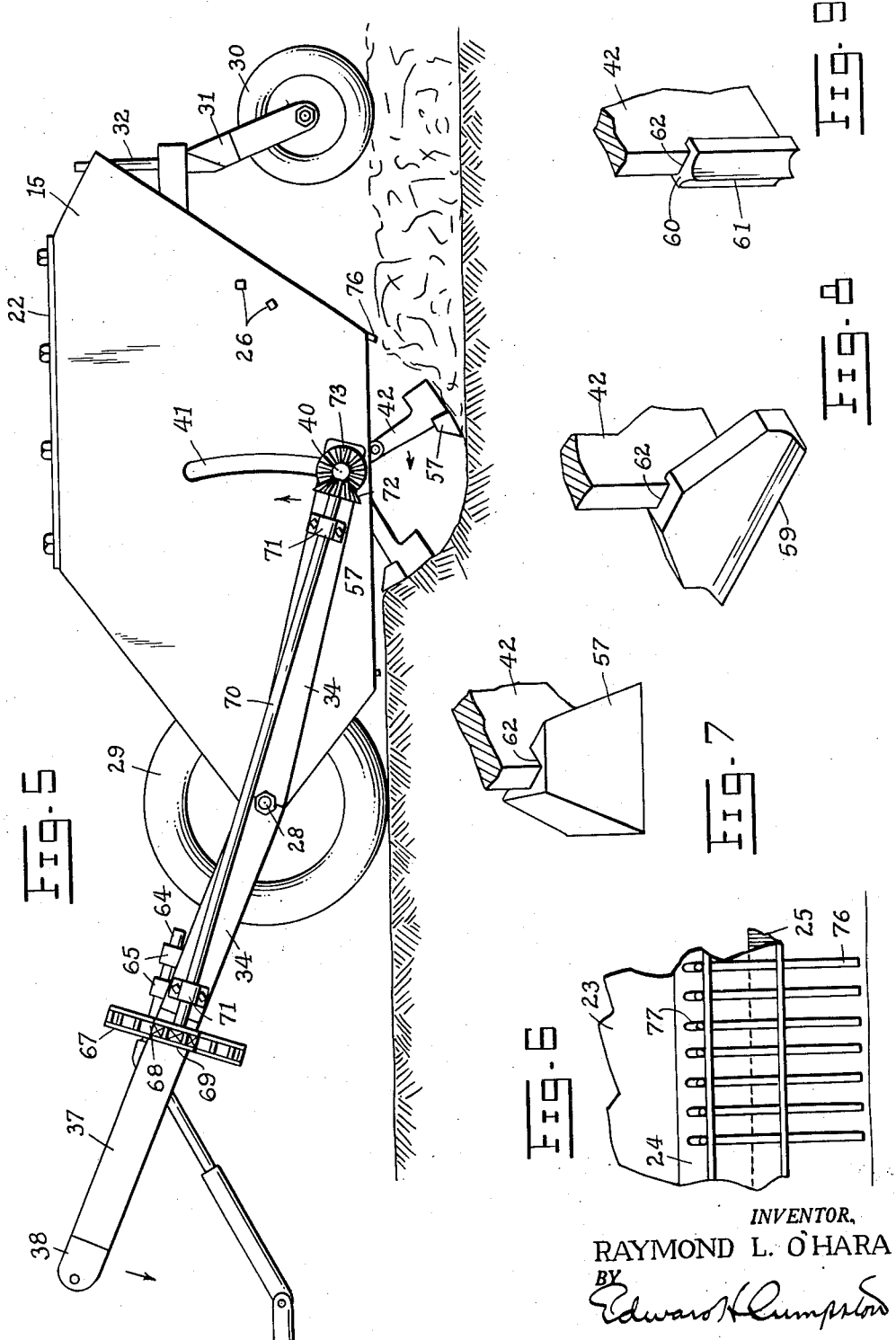
INVENTOR.
RAYMOND L. O'HARA
BY Edward H. Cumpston
HIS ATTORNEY.

United States Patent Office 2,795,176
Patented June 11, 1957

2,795,176

PULVERIZING MACHINE

Raymond L. O'Hara, Belfast, N. Y.

Application September 29, 1955, Serial No. 537,410

4 Claims. (Cl. 97—40)

This invention relates to machines for tilling the soil, pulverizing vegetation, crushing stone and the like, by rapidly rotating tools or hammers while being towed over the ground, one object being the provision of an improved machine of this character having a more practical and economical construction and mode of operation for accomplishing a wide variety of work.

Another object is to provide such a machine comprising readily removable, adjustable and interchangeable impact tools for adaptation to various operations.

Another object is to provide a machine of this character adapted to be towed by a tractor or other motor vehicle with means readily controlled by the operator of the vehicle for controlling and adapting the operation of the machine to different working conditions.

A further object is to supply a more adaptable machine of this type capable of reducing relatively high and dense bodies of material such as thick brush or undergrowth, by backing the machine rearwardly into such materials instead of towing it in forward operation.

Still a further object is the provision of such a machine with a type of construction adapted to be readily and economically manufactured, assembled and maintained in efficient operating condition.

To these and other ends the invention resides in certain improvements and combinations of parts, all as will be hereinafter more fully described, the novel features being pointed out in the claims at the end of the specification.

In the drawings:

Fig. 2 is a sectional side elevation of the same as seen from the line 2—2 in Fig. 1, with the impact tools in a raised position;

Fig. 3 is a sectional view on the line 3—3 in Fig. 4 showing a tool arm and its mounting;

Fig. 4 is a side view of the same as seen from below in Fig. 3;

Fig. 5 is a side elevation of the machine, similar to Fig. 2, but showing the tool shaft and arms in lowered position for tilling the soil;

Fig. 6 is an enlarged, fragmentary, rear elevation of screen means on the rear end of the housing as shown in Fig. 2;

Fig. 7 is an enlarged, fragmentary, perspective view of a portion of a tool arm and a tool as shown in Fig. 5;

Figs. 8 and 9 are enlarged, fragmentary, perspective views of tool arms and modified forms of pulverizing tools.

Figure 1:
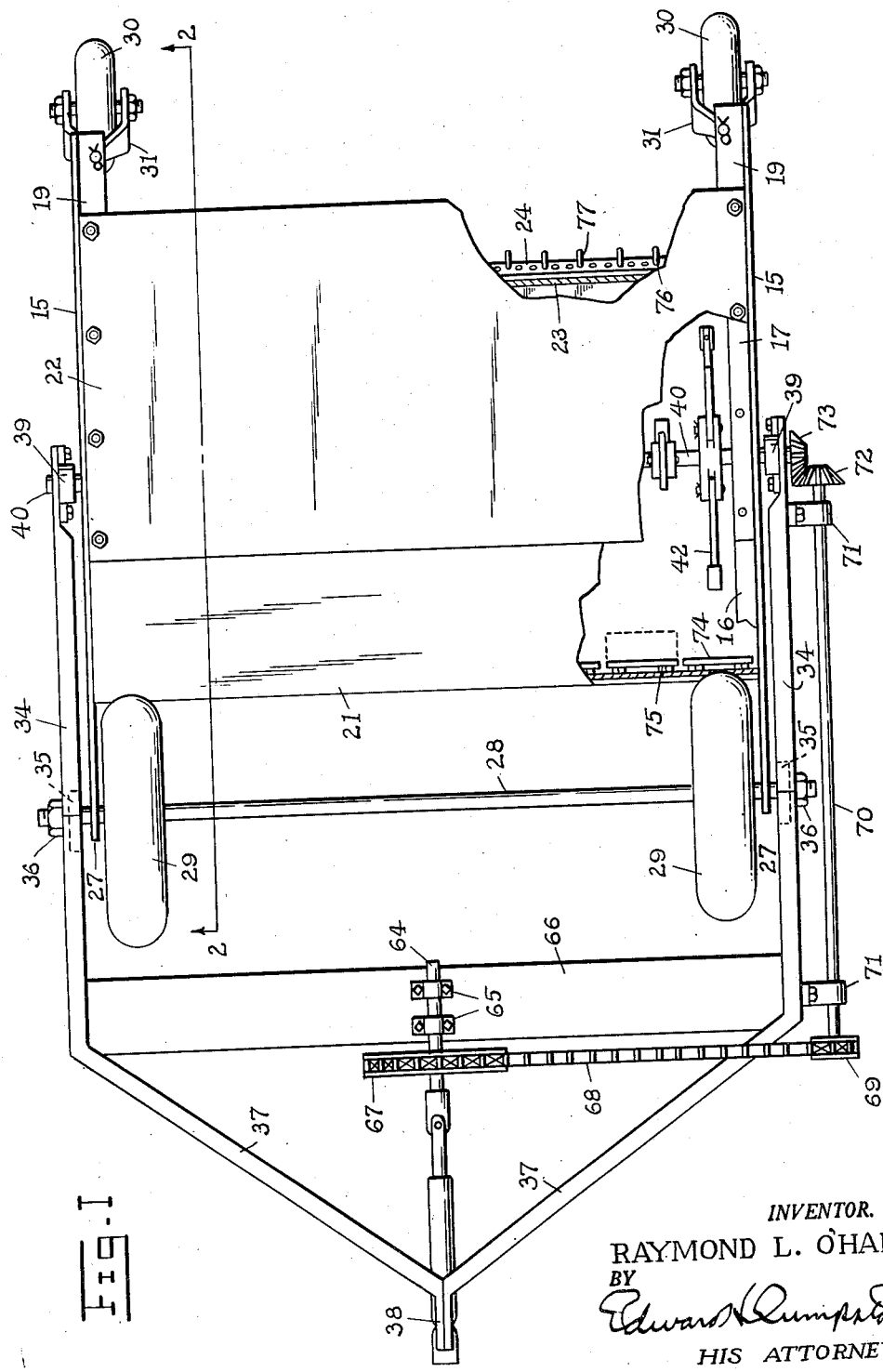
Fig. 1 is a top plan view, partly broken away, of a machine embodying the present invention.

The preferred embodiment of the invention, herein disclosed by way of illustration, comprises a main frame and housing for the same having spaced side plates 15 of the irregular shape shown, to the inner sides of each of which are affixed by any suitable means, such as welding, the several angle bars 16, 17, 18, 19 and 20. The bars 16 toward the front of the frame have fixed thereto, as by welding, a plate 21 forming the forward end of the housing. This plate is preferably inclined downwardly and forwardly, as shown, for a purpose hereafter described. The bars 18 are preferably inclined downwardly and forwardly in spaced relation to the forward ends of the horizontal bars 19 and 20, so as to leave therebetween oppositely spaced slots into which is removably slid a plate 23 forming the rear end of the housing. The side plates 15 are connected by a top plate 22 and by a pair of angle bars 24 and 25, removably fixed thereto, respectively, by bolts, as 26, and these laterally extending bars are spaced from the bars 18 to further provide the slot referred to above for receiving and supporting the rear plate 23, which is supported at its lower edge on the flange of the bar 25, as shown. The foregoing parts thus provide a strong and rigid main frame and a housing with an open bottom for enclosing the pulverizing hammers and their shaft, as hereafter further described.

The side plates 15 have their forward ends extended, as at 27, and supported on a transverse axle 28 carrying a pair of ground wheels 29. The ends of the axle extend through openings in the side plates and outwardly through suitable bearings in the spaced arms of an auxiliary frame, hereafter described. These ground engaging wheels 29 support the forward end of the machine, assisted by rear swivel wheels 30.

Each rear wheel 30 is rotatably mounted between spaced supporting plates 31, fixed to the lower end of a short shaft 32 turning in openings in the flanges of the corresponding angle bars 19 and 20, with a cotter pin 33 for securing the shaft in such bearings. As shown, the supporting plates 31 are inclined rearwardly and the rear end of the housing is inclined forwardly so that these rear wheels have clearance to swivel on the main frame in accordance with its direction of travel. These laterally spaced rear wheels 30 and the laterally spaced forward wheels 29 support the main frame and housing in predetermined, substantially horizontal relation to the ground with the bottom edges of the side plates 15 close to the ground. The forward and rear end plates 21 and 23 have their lower edges at a somewhat higher elevation above the ground than side plates 15 and are provided with means for controlling the movements of the material being worked, as hereafter described. The housing is thus left with an open bottom through which the pulverizing tools or hammers engage the soil or other material to be worked.

The pulverizing hammer means are carried by an auxiliary frame comprising laterally spaced arms 34 which embrace in spaced relation the side plates 15 of the main frame. Arms 34 are preferably constructed of channel bars having their flanges turned inwardly and each bars has fixed between its flanges a bearing block 35 for the adjacent end of the axle 28, the axle end being extended through an opening in each bar and provided with a nut 36 for holding it in place. Bars or arms 34 have their forward end portions inclined inwardly toward each other, as at 37, and provided with terminal portions 38 adapted for attachment to the tow couplings of a tractor, preferably of a well known variety operated by a hydraulic lift, for receiving and lowering the forward ends of the arms 34 and thus swinging them about the outer ends of axle 28, the rear ends of arms 34 having mounted therein the transversely extending shaft for the pulverizing hammer arms, hereafter described.

The rear ends of arms 34 of the axle frame are provided with bearings 39 for rotatably supporting the rounded outer ends of the shaft 40 carrying the pulverizing hammer arms. Shaft 40 passes through arcuate slots 41 (Fig. 5) in the side plates 15 of the main frame and housing. The portion of the shaft within the housing is formed with an angular cross-sectional shape, preferably square as shown, to positively engage and drive the pulverizing hammer arms.

The hammer arms 42 (Figs. 2 to 4, inclusive) are preferably in the form of relatively thick plates, as shown, the inner ends of which are formed with bearing openings 43 and pivotally mounted on pins 44 passing therethrough and through the spaced arms 45 of clamping heads, indicated generally at 46, for clamping engagement with shaft 40.

Each clamping head 46 preferably comprises opposing parts, 47 and 48, of the irregular shape best shown in Fig. 3. Each part is formed with surfaces, as 49 and 50, for engagement with two adjacent sides of the square shaft 40, the parts having inclined surfaces, as 51, for engagement with each other. Bolts 52 are passed through these parts for securely clamping them to each other and in non-rotary engagement with the shaft 40, but these bolts may be loosened to free the clamping heads for sliding adjustment along the shaft to vary their spacing from one another, after which the heads are again securely clamped in place. This clamping head is relatively simple but practical and efficient for adjustably and securely clamping the heads in selected position on the shaft. Each part has a similar pair of arms 45 for supporting a pair of hammer arms extending in opposite directions outwardly from the shaft.

Each hammer arm is preferably enlarged at its outer end, as at 53, to both strengthen it and dispose the major portion of its weight at its outer end for enhancing the force of impact by the hammer or tool 54 fixed to the leading edge of its outer end, as shown.

Means are preferably provided for yieldably holding each hammer arm in a position extending outwardly, preferably radially, from the shaft 40, comprising a coiled compression spring 55 having one end bearing against the squared inner end of the hammer arm and the other end seated in a retaining socket 56 in the adjacent clamping part 47. It is apparent from this arrangement that the pressure of the spring against the end of the hammer arm serves to hold it in radially extending position, but subject to resilient yielding and this provision enables the arm to yield in case of impact against an unyielding object, as well as to yield in response to inertia during the starting and stopping of the shaft, thus promoting the smoother operation of the machine.

The pulverizing tools or hammers may take various forms to suit the work in hand. They may thus have the simple flat-faced, rectangular shape shown at 54 (Figs. 2 to 4, inclusive) for positive impact action. Or they may have the pyramid-like shape shown at 57 in Figs. 5 and 7 for tilling the soil. Or they may have the more plate-like shape with a lower, forwardly extending cutting edge 59, as shown in Fig. 8, or the shape shown at 60 with an upwardly extending medial cutting edge 61, as shown in Fig. 9. In each case the rear surface of the hammer is formed to provide a groove, as 62 (Figs. 7, 8 and 9), to receive and be seated upon the leading edge of the hammer arm, as shown, a bolt 63 (Fig. 3) being passed through the arm and into the hammer or tool, to fix it, removably but securely, to the arm. It is evident that such hammers or tools may be interchangeably employed, either all of the same kind at any given time, or with some of one kind and some of another, and that a single elongated hammer may be affixed to two or more adjacent arms with such arms mounted on shaft 40 to extend in the same radial plane. Preferably, however, each arm is positioned with its hammer slightly in advance of the hammer of the next adjacent arm circumferentially of shaft 40, so that the impacts occur seriatim or successively in each rotation of shaft 40.

It is apparent from the above description that as the forward ends 38 of the auxiliary frame are raised or lowered to swing the frame about axle 28, shaft 40 and its hammer arms are correspondingly lowered into proximity with the ground, as in tilling operations (Fig. 5) or raised for operation at a higher level, or to inactive position, as indicated in Fig. 2, such adjustment being conveniently controlled by the operator of the towing tractor, by adjusting the elevation of its towing coupling, as well understood in the art. The arms of the auxiliary frame thus serve the functions of both towing the machine in operation and adjusting the elevation of its pulverizing tools to accomplish the desired work.

The means for rotating shaft 40 preferably comprises a flexible or universal drive shaft 64 mounted in bearings, as 65, on a transverse plate 66 connecting and supporting the arms 34 of the auxiliary frame. Shaft 64 has its forward end adapted for connection with the power take-off of a tractor and has fixed thereon a sprocket wheel 67 connected by a chain 68 with a sprocket wheel 69 fixed on a shaft 70 extending along the outside of one of the arms 34 of the auxiliary frame. Shaft 70 is rotatably mounted in bearings 71 on the frame arm and carries at its rear end a gear 72 meshing with a gear 73 fixed on an end of shaft 40 which is extended outwardly for that purpose beyond its bearing 39 in the auxiliary frame. It is apparent from this construction that as the machine is towed over the ground, its hammer arm shaft 40 is rotated by connection with the power take-off of the tractor and may be rotated at a desired speed regulated by control of the power take-off, as well understood in the art.

The pulverizing hammers are rotated forwardly in the region of impact in the same forward direction as the travel of the machine and as indicated by the arrow in Fig. 5. The impact of the hammers with the material to be worked tends to drive portions of the material forwardly against the inclined forward end 21 of the housing which deflects the material downwardly for reworking by the hammers. The lower edge of the forward end 21 is somewhat elevated, as described, to clear obstructions, but is provided with a plurality of plates 74 depending in laterally spaced relation from the edge of the end of the housing as shown, each plate being mounted at 75 on the housing to swing and yield rearwardly and upwardly as shown in broken lines in Fig. 2, to enable them to pass obstructions on the ground. The weight of the plates, however, tends to maintain them normally in the lowered full line position shown, for the purpose of normally closing the opening at the front of the housing and thus prevent the escape of portions of the material driven forwardly by the hammers.

Means are provided for the rear end of the housing for retaining materials therein until reduced to a desired degree of fineness, such means comprising a series of rods 76 (Figs. 2 and 6), passed through socket openings in the angle bars 24 and 25 and having their upper ends bent angularly, as at 77, to retain them in the bars. The rods extend at their lower ends adjacent the ground and may be variably spaced from each other in selected openings in the angle bars so as to vary the intervals between adjacent rods and thus vary the size of the escape openings and the degree of fineness of the pulverized material.

The operation of the machine has been described above in connection with the description of its construction and it is evident that as the machine is towed forwardly with its hammer arms rotating at suitable speed and at suitable elevation in relation to the work, the hammers or tools are brought into impact with the soil or other material to be worked, thus breaking it up and pulverizing it to a degree regulated by the spacing of the hammer arms and the character of the hammers affixed thereto. The machine is thus adapted for efficient tilling of the soil, cutting and mulching vegetable growth, or breaking up hard or rocky materials, pavement portions and the like. It is employed also for breaking up accumulations of brush too high or dense to be readily reduced by towing the machine forwardly. For this purpose the top plate 22, rear end 23 and transverse bars 24 and 25 may be removed so that the machine can be backed into pulverizing engagement with such materials. These advantageous uses are referred to, however, merely as illustrations, rather than by way of limitation, as will be apparent to those skilled in the operation of such machines.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. In a pulverizing machine for coupling to a motor vehicle having tow coupling means and a power take-off, the combination of a main frame, ground engaging wheels spaced from one another laterally and longitudinally on said frame to support the same in predetermined relation to the ground, a housing substantially enclosing said main frame with its bottom extending adjacent the ground, an auxiliary frame having spaced arms embracing the lateral sides of said housing and mounted on said main frame and housing for pivotal movement about an axis extending laterally thereof, a laterally extending shaft rotatably supported in said auxiliary frame in rear of said pivotal axis thereof and extending through elongated openings in said housing for movement to different elevations therein, radially extending arms on said shaft having their outer ends provided with pulverizing tools, driving means on said auxiliary frame for connecting said power take-off with said shaft to rotate the same, and draft bar means on said auxiliary frame for connection with said tow coupling means.

2. In a pulverizing machine for coupling to a motor vehicle having tow coupling means and a power take-off, the combination of a main frame, ground engaging wheels spaced from one another laterally and longitudinally on said frame to support the same in predetermined relation to the ground, said main frame comprising a housing enclosing the same and extending at its bottom adjacent the ground, a plurality of plates depending in laterally spaced relation from the bottom of the forward end of said housing and mounted thereon to swing rearwardly and upwardly in contact with the ground for yieldably restricting the space between said housing and ground and containing material to be pulverized within said housing, an auxiliary frame having spaced arms embracing said main frame and mounted for movement thereon substantially about an axis extending laterally thereof, a shaft rotatably supported in said auxiliary frame in rear of said axis thereof and extending laterally through openings in said housing, a plurality of arms mounted in laterally spaced relation along said shaft and provided at their outer ends with pulverizing tools, driving means for connecting said power take-off with said shaft, and draft bar means for connection with said tow coupling means.

3. In a pulverizing machine for coupling to a motor vehicle having tow coupling means and a power take-off, the combination of a main frame, ground engaging wheels spaced from one another laterally and longitudinally on said frame to support the same in predetermined relation to the ground, said main frame comprising a housing enclosing the same with an open bottom extending adjacent the ground, an auxiliary frame mounted on said main frame and housing for movement substantially about an axis extending laterally thereof, a laterally extending shaft rotatably supported in said auxiliary frame in rear of said axis thereof, a plurality of arms in laterally spaced relation on said shaft and extending substantially radially therefrom with their outer ends provided with pulverizing tools, the bottom portion of said housing at the rear end thereof being formed with a series of laterally spaced socket openings, rods removably mounted in said openings and depending adjacent the ground to provide an adjustable screen for discharging pulverized material of predetermined size, driving means for connecting said power take-off with said shaft, and draft bar means for connection with said tow coupling means.

4. In a pulverizing machine for coupling to a motor vehicle having tow coupling means and a power take-off, the combination of a main frame, ground engaging wheels spaced from one another laterally and longitudinally on said frame to support the same in predetermined relation to the ground, said main frame having an enclosing housing with an open bottom extending adjacent the ground and comprising separately removable top and rear wall portions, an auxiliary frame having spaced arms embracing and pivotally mounted on said main frame and housing, a shaft rotatably supported in said auxiliary frame in rear of said mounting thereof and extending laterally through openings in said main frame and housing, a plurality of tool arms in laterally spaced relation on said shaft and provided at their outer ends with pulverizing tools, driving means for connecting said power take-off with said shaft, and draft bar means for connection with said tow coupling means.

References Cited in the file of this patent

UNITED STATES PATENTS

| Number | Name | Date |
|---|---|---|
| 46,048 | Fithian | Jan. 24, 1865 |
| 1,663,249 | Graham et al. | Mar. 20, 1928 |
| 1,718,564 | Kietzke | June 25, 1929 |
| 1,951,701 | Major | Mar. 20, 1934 |